United States Patent
Yao et al.

(10) Patent No.: US 10,967,713 B2
(45) Date of Patent: Apr. 6, 2021

(54) VEHICLE SIDE DOOR

(71) Applicant: Toyota Jidosha Kabushiki Kaisha, Toyota (JP)

(72) Inventors: Takashi Yao, Toyota (JP); Shigeki Kojima, Kasugai (JP); Tomoyuki Itoh, Nagoya (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 61 days.

(21) Appl. No.: 16/395,568

(22) Filed: Apr. 26, 2019

(65) Prior Publication Data
US 2019/0381870 A1  Dec. 19, 2019

(30) Foreign Application Priority Data
Jun. 18, 2018 (JP) .............................. JP2018-115137

(51) Int. Cl.
| | | |
|---|---|---|
| *B60J 5/04* | (2006.01) | |
| *B60R 21/13* | (2006.01) | |
| *B60R 1/06* | (2006.01) | |
| *B60R 21/00* | (2006.01) | |

(52) U.S. Cl.
CPC ........... *B60J 5/0404* (2013.01); *B60J 5/0436* (2013.01); *B60R 1/06* (2013.01); *B60R 21/13* (2013.01); *B60J 5/0461* (2013.01); *B60R 2021/0018* (2013.01)

(58) Field of Classification Search
CPC ...... B60J 5/0401; B60J 5/0404; B60J 5/0422; B60J 5/0436; B60R 21/13

USPC .............................................. 296/1.11, 146.6
See application file for complete search history.

(56) References Cited

U.S. PATENT DOCUMENTS

| | | | |
|---|---|---|---|
| 7,699,285 B2 * | 4/2010 | Brancaleone | B60R 1/06 248/475.1 |
| 9,016,747 B2 * | 4/2015 | Kuroki | B60J 5/0429 296/1.11 |
| 2009/0134304 A1 * | 5/2009 | Rieder | B60R 1/06 248/475.1 |
| 2011/0157734 A1 | 6/2011 | Muller et al. | |
| 2011/0308168 A1 * | 12/2011 | Yasuhara | B60J 5/0431 49/399 |
| 2014/0132029 A1 | 5/2014 | Kuroki | |
| 2015/0239327 A1 * | 8/2015 | Brancaleone | B60J 5/0468 296/146.6 |

FOREIGN PATENT DOCUMENTS

| | | |
|---|---|---|
| CN | 103802642 A | 5/2014 |
| JP | 2003-160077 A | 6/2003 |

* cited by examiner

*Primary Examiner* — Jason S Daniels
(74) *Attorney, Agent, or Firm* — Dinsmore & Shohl LLP (57) ABSTRACT

A vehicle side door includes: a door main body; a mirror stay fixed to the door main body so as to be at least partially placed outwardly from the door main body, the mirror stay including a support portion placed outwardly from the door main body; and a mirror unit including a mirror holder supported by the support portion, and a mirror supported by the mirror holder, wherein: the door main body includes an outer panel constituting an outer face of the door main body, an inner panel placed inwardly from the outer panel and fixed to the outer panel, and a reinforcing member fixed to the inner panel or the outer panel; and the mirror stay is fixed to the reinforcing member.

4 Claims, 5 Drawing Sheets

VEHICLE SIDE DOOR

CROSS-REFERENCE TO RELATED APPLICATIONS

This application claims priority to Japanese Patent Application No. 2018-115137 filed on Jun. 18, 2018, which is incorporated herein by reference in its entirety including the specification, drawings and abstract.

BACKGROUND

1. Technical Field

The disclosure relates to a vehicle side door.

2. Description of Related Art

Japanese Unexamined Patent Application Publication No. 2003-160077 (JP 2003-160077 A) describes a two-wheel-type vehicle. This vehicle includes a vehicle body and two wheels (one front wheel and one rear wheel). A driver seat is provided in a cabin (a passenger cabin space) formed inside the vehicle body.

Further, right and left rollover reduction members are provided on right and left side portions of the seat, respectively. Each of the right and left rollover reduction members is movable relative to the seat in the right-left direction between a stored position and an overhanging position. When the rollover reduction member is placed at the stored position, the whole rollover reduction member is placed inside the cabin. In the meantime, when the rollover reduction member is placed at the overhanging position, an outer end portion (a distal end portion) of the rollover reduction member is placed on the outer side (lateral side) of the vehicle body.

In the vehicle, when the vehicle rolls over, the rollover reduction member is moved from the stored position to the overhanging position. Hereby, the distal end portion of the rollover reduction member is brought into contact with a road surface, so that a risk that the side portion of the vehicle body severely collides with the road surface is reduced.

SUMMARY

However, the side portion of the vehicle body might collide with the road surface before the rollover reduction member reaches the overhanging position, and as a result, the side portion of the vehicle might greatly deform.

The disclosure provides a vehicle side door that can restrain a side portion of a vehicle from greatly deforming due to a collision with a road surface when the vehicle rolls over.

An aspect of the present disclosure relates to a vehicle side door including: a door main body configured to open and close a side face opening of a vehicle; a mirror stay fixed to the door main body so as to be at least partially placed outwardly from the door main body in a vehicle right-left direction, the mirror stay including a support portion placed outwardly from the door main body in the vehicle right-left direction; and a mirror unit including a mirror holder supported by the support portion, and a mirror supported by the mirror holder, wherein: the door main body includes an outer panel constituting an outer face of the door main body in the vehicle right-left direction, an inner panel placed inwardly from the outer panel in the vehicle right-left direction and fixed to the outer panel, and a reinforcing member fixed to the inner panel or the outer panel and extending in a front-rear direction; and the mirror stay is fixed to the reinforcing member.

Here, the "mirror holder supported by the support portion" indicates both a mirror holder directly supported by the support portion, and a mirror holder indirectly supported by the support portion via a member different from the support portion and the mirror holder.

In the vehicle side door of the disclosure, at least a part of the mirror stay is placed outwardly from the door main body in the vehicle right-left direction. Further, the mirror stay is fixed to the reinforcing member.

On that account when another vehicle collides with a right side portion of the vehicle to which the disclosure is applied and the vehicle rolls over to the left side, for example, the mirror stay and the mirror unit of the side door attached to a left side face opening collide with a road surface. In this case, the mirror unit is more likely to be damaged. Meanwhile, the mirror stay surely receives an impact force transmitted from the road surface. This makes it possible to restrain the side door from severely colliding with the road surface and greatly deforming.

In the above aspect, an inner end portion of the mirror stay in the vehicle right-left direction may be fixed to the reinforcing member, and the mirror stay may be configured such that the inner end portion in the vehicle right-left direction has a largest mechanical strength in the mirror stay.

When an outer end portion of the mirror stay in the vehicle right-left direction collides with the road surface, a large force is applied to the inner end portion of the mirror stay in the vehicle right-left direction. However, when the disclosure is carried out in this aspect, a risk that the inner end portion of the mirror stay in the vehicle right-left direction deforms or breaks is small, so that the side door is surely restrained from greatly deforming.

In the above aspect, the mirror stay may be configured such that the inner end portion in the vehicle right-left direction has a largest sectional area in the mirror stay when the mirror stay is cut along a plane perpendicular to a width direction of the vehicle.

When the disclosure is carried out in this aspect, the mechanical strength of the inner end portion of the mirror stay in the vehicle right-left direction can be made higher than that of the outer end portion of the mirror stay in the vehicle right-left direction.

In the above aspect, the vehicle side door may further include a spacer disposed in a gap between the inner panel and the outer panel, the spacer being placed behind the mirror stay so as to be fixed to the inner panel or a member fixed to the inner panel.

In the disclosure carried out in this aspect, when the outer panel colliding with the road surface deforms toward the inner panel side at the time when the vehicle rolls over, the outer panel makes contact with the spacer. Accordingly, a risk that the outer panel largely deforms toward the inner panel side can be reduced.

In the above aspect, the member may be the reinforcing member.

When the disclosure is carried out in this aspect, a risk that the outer panel largely deforms toward the inner panel side can be reduced.

In the above aspect, a section of the outer panel when the outer panel is cut along a horizontal plane may have an arcuate shape; a part, of the arcuate shape, placed on an outermost side in the vehicle right-left direction when the door main body closes the side face opening may be an outwardly projecting portion projecting outwardly in the vehicle right-left direction; and the spacer may face the outwardly projecting portion.

The "arcuate shape" includes an exact arcuate shape and a generally arcuate shape.

When the disclosure is carried out in this aspect, the outwardly projecting portion in the outer panel most easily collides with the road surface at the time when the vehicle rolls over, so that the outwardly projecting portion is most likely to deform in the outer panel. However, the spacer surely restrains the outwardly projecting portion from greatly deforming toward the inner panel side.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

The following describes a vehicle 10 including a vehicle side door according to an embodiment of the disclosure with reference to FIGS. 1 to 10. In this disclosure, "front," "rear," "left," "right," "up," and "down" indicate front, rear, left, right, up, and down in the vehicle.

Figure 1:
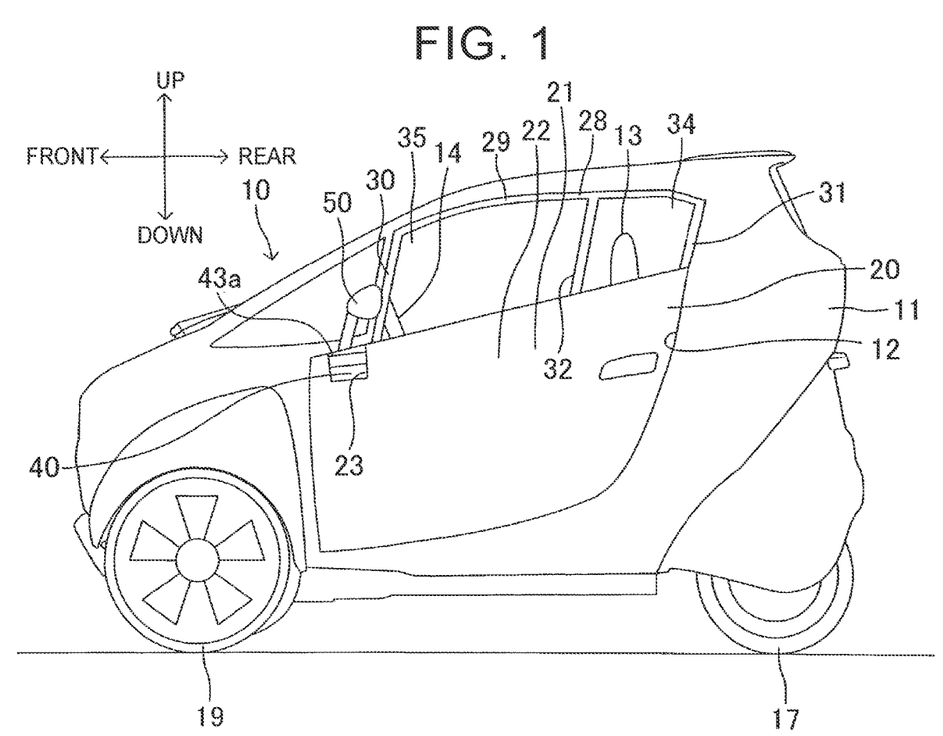
FIG. 1 is a side view of a vehicle including a vehicle side door according to an embodiment of the disclosure.

As illustrated in FIG. 1, the vehicle 10 includes a vehicle body 11, one rear wheel 17, a pair of right and left front wheels 19, and a pair of right and left side doors 20. That is, the vehicle 10 is a three-wheeled vehicle.

A seat 13 and a steering wheel 14 are disposed in a passenger cabin space of the vehicle body 11. As generally known, the steering wheel 14 is rotatable around its axis.

The rear wheel 17 is provided in a rear portion of the vehicle body 11 so as to be supported rotatably relative to the vehicle body 11. The rear wheel 17 is a steered wheel the steered angle of which changes in accordance with the rotation operation of the steering wheel 14. The right and left front wheels 19 are provided in a front portion of the vehicle body 11 so as to be supported rotatably relative to the vehicle body 11. The right and left front wheels 19 are driving wheels rotated by drive sources (respective in-wheel motors (not shown) provided in the front wheels 19 in the present embodiment).

As illustrated in FIG. 1, a door opening 12 is formed in each of right and left side portions of the vehicle body 11 (only the left door opening 12 is illustrated in FIG. 1). Further, front end portions of the side doors 20 having respective shapes corresponding to the door openings 12 are supported by front end portions of the left and right door openings 12 in a rotatable manner around respective rotating axes in the up-down direction. Each of the right and left side doors 20 is rotatable relative to the vehicle body 11 between a fully closed position (illustrated in FIG. 1 and FIGS. 8A, 8B) at which a corresponding door opening 12 is closed and a fully open position (not shown) at which the corresponding door opening 12 is opened. That is, the right and left side doors 20 are swing doors.

The side door 20 includes a well-known locking mechanism (not shown). When the side door 20 is placed at the closed position and the locking mechanism is in a locked state, the side door 20 is kept at the closed position. In the meantime, when the locking mechanism is in an unlocked state, the side door 20 is rotatable between the closed position and the open position.

The right and left side doors 20 each include a door main body 21, a mirror stay 40, a mirror unit 50, and a spacer 57.

Figure 2:
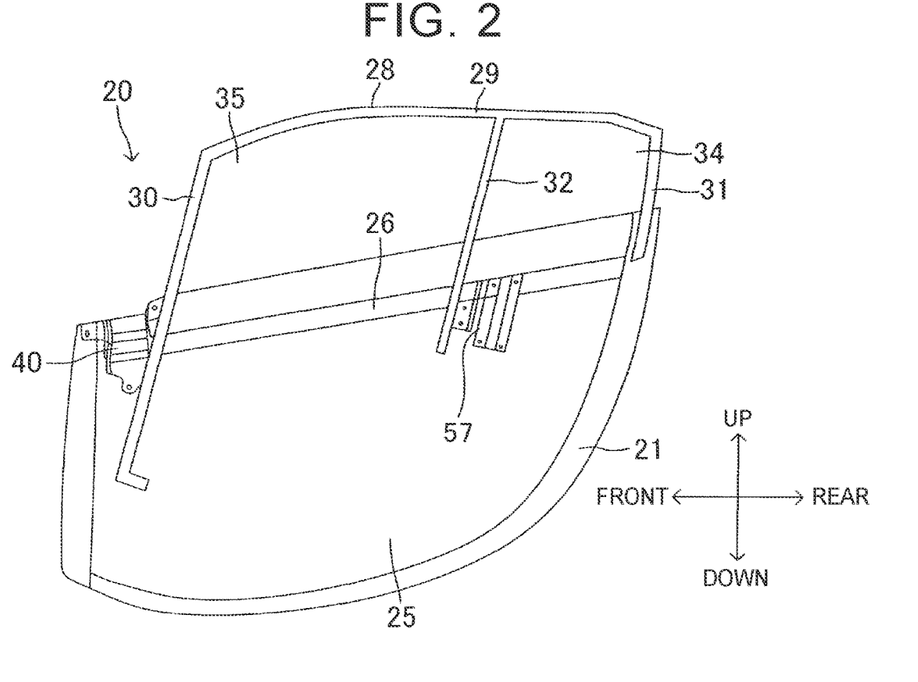
FIG. 2 is a side view of the side door from which an outer panel is removed, the side door being viewed from the outer side in the vehicle right-left direction.
Figure 5:
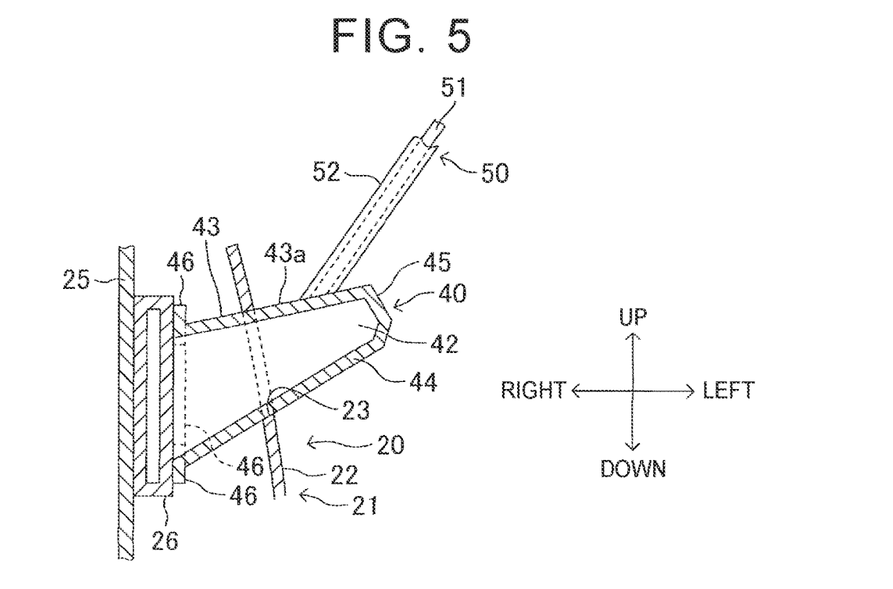
FIG. 5 is a sectional view taken along an arrow V-V in FIG. 3.

As illustrated in FIGS. 1, 2, and 5, the door main body 21 constituting a lower-half part of the side door 20 includes an outer panel 22, an inner panel 25, a reinforcing member 26, a door sash 28, a fixed window 34, a sliding window 35, and a trim (not shown).

Figure 3:
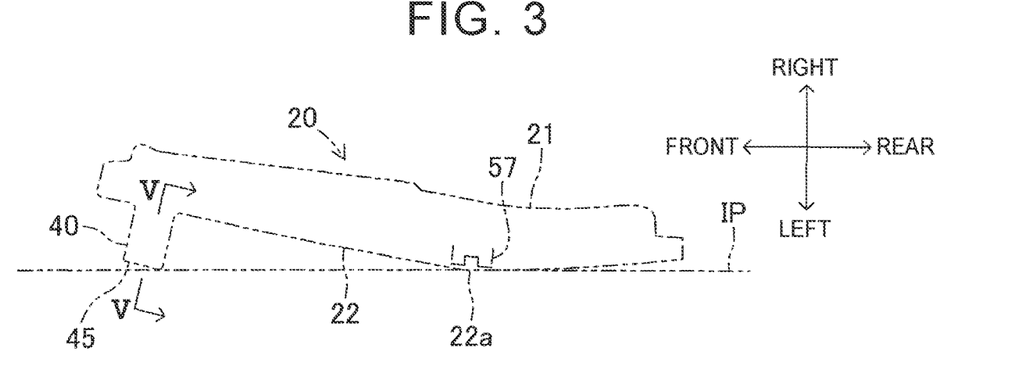
FIG. 3 is a schematic plan view of the side door illustrated without some members.

An outer face of the door main body 21 in the vehicle right-left direction is constituted by the outer panel 22 made of a metal plate. As illustrated in FIGS. 1 and 5, the outer panel 22 has an opening 23 formed in an upper part near the front end portion of the outer panel 22. As illustrated in FIG. 3, a sectional shape of the outer panel 22 when the outer panel 22 is cut along a horizontal plane is an arcuate shape and is not a straight line. Note that the "arcuate shape" includes an exact arcuate shape and a generally arcuate shape. Accordingly, an outwardly projecting portion 22a that projects outwardly in the vehicle right-left direction is formed in a part of the outer panel 22 slightly behind the central part of the outer panel 22 in the front-rear direction. The outwardly projecting portion 22a is placed on the outermost side in the vehicle right-left direction in the outer panel 22 at the time when the side door 20 is placed at the fully closed position.

Figure 9:
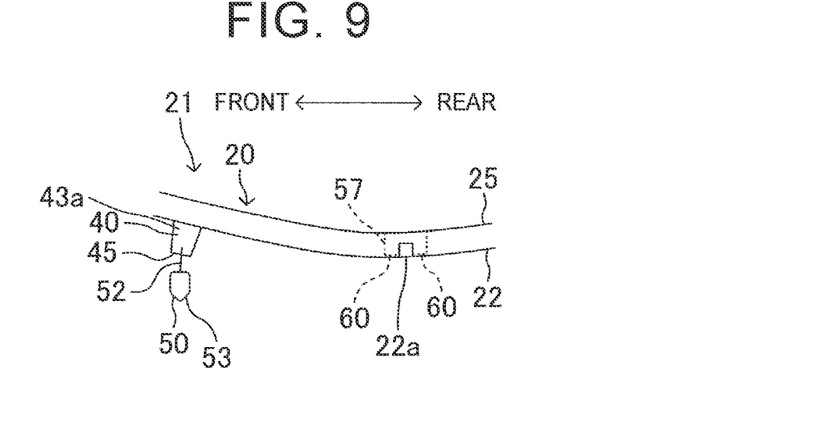
FIG. 9 is a schematic plan view illustrating a part of the side door.
Figure 10:
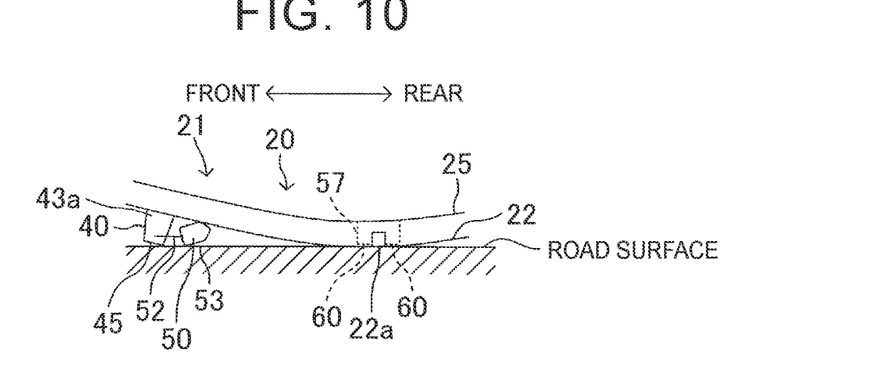
FIG. 10 is a schematic plan view illustrating a part of the side door when the vehicle rolls over to the left side.

As illustrated in FIGS. 2 and 5, the inner panel 25 made of a metal plate is placed inwardly in the vehicle right-left direction from the outer panel 22. As illustrated in FIGS. 9 and 10, a sectional shape of the inner panel 25 when the inner panel 25 is cut along a horizontal plane is an arcuate shape and is not a straight line. The "arcuate shape" includes an exact arcuate shape and a generally arcuate shape.

The metal reinforcing member 26 extending in the front-rear direction is fixed to an upper part of an outer face, in the vehicle right-left direction, of the inner panel 25. The reinforcing member 26 is a tubular member having a generally rectangular sectional shape. The mechanical strength of the reinforcing member 26 is higher than those of the outer panel 22 and the inner panel 25. That is, for example, when another vehicle collides with the side door 20 or when the vehicle 10 rolls over and the side door 20 collides with a road surface, a deformation amount of the reinforcing member 26 is smaller than deformation amounts of the outer panel 22 and the inner panel 25.

As illustrated in FIGS. 1 and 2, the door sash 28 constituting an upper part of the door main body 21 and made of metal is fixed to the inner panel 25. The door sash 28 includes an upper sash 29 extending generally in the front-rear direction. Further, the door sash 28 includes a front sash 30, a rear sash 31, and a glass run 32 that extend downward from the upper sash 29. The glass run 32 is placed between the front sash 30 and the rear sash 31.

Figure 7:
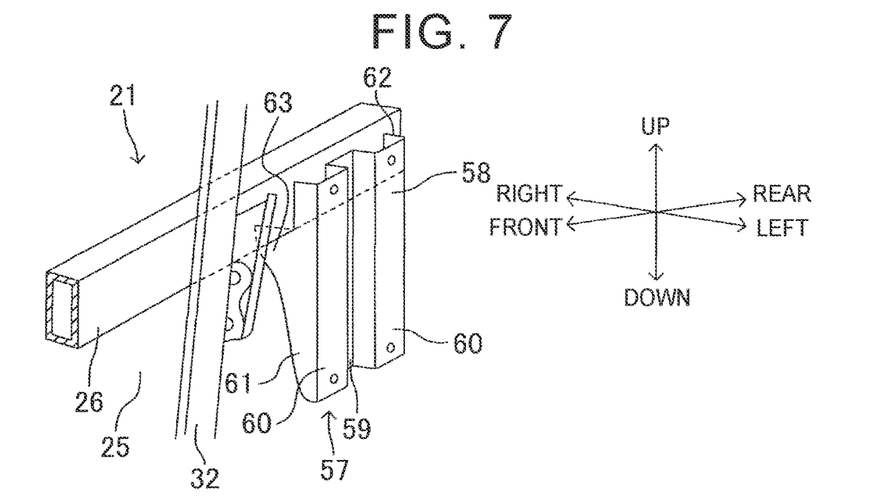
FIG. 7 is a perspective view of an inner panel, a reinforcing member, a glass run, and a spacer viewed from the outer side in the vehicle right-left direction.

As illustrated in FIG. 2, the rear sash 31 is placed behind a rear end of the reinforcing member 26, and a lower part of the rear sash 31 is fixed to the outer face of the inner panel 25 in the vehicle right-left direction. Further, as illustrated in FIGS. 2 and 7, respective lower parts of the front sash 30 and the glass run 32 are placed outwardly from the reinforcing member 26 in the vehicle right-left direction and fixed, respectively, to the outer face of the inner panel 25 and an outer face of the reinforcing member 26 in the vehicle right-left direction.

As illustrated in FIG. 2, the fixed window 34 is disposed in a space surrounded by a rear part of the upper sash 29, the rear sash 31, and the glass run 32. The fixed window 34 is fixed to the upper sash 29, the rear sash 31, and the glass run 32.

A glass run (not shown) is fixed to a rear face of the front sash 30. A front edge portion and a rear edge portion of the sliding window 35 are supported by this glass run and the glass run 32 so as to be slidable in the up-down direction. The sliding window 35 is movable in the up-down direction relative to the inner panel 25 and the door sash 28, between a fully closed position illustrated in FIG. 1 and a fully open position (not shown) that is a position below the fully closed position and at which an opening formed between the front sash 30 and the glass run 32 is opened.

A peripheral portion of the inner panel 25, except an upper edge portion integrated with the door sash 28, is fixed to an inner face of the outer panel 22 in the vehicle right-left direction. A space (gap) is formed between the inner panel 25 and the outer panel 22. Further, a resin trim (not shown) is fixed to an inner face of the inner panel 25 in the vehicle right-left direction.

Figure 4:
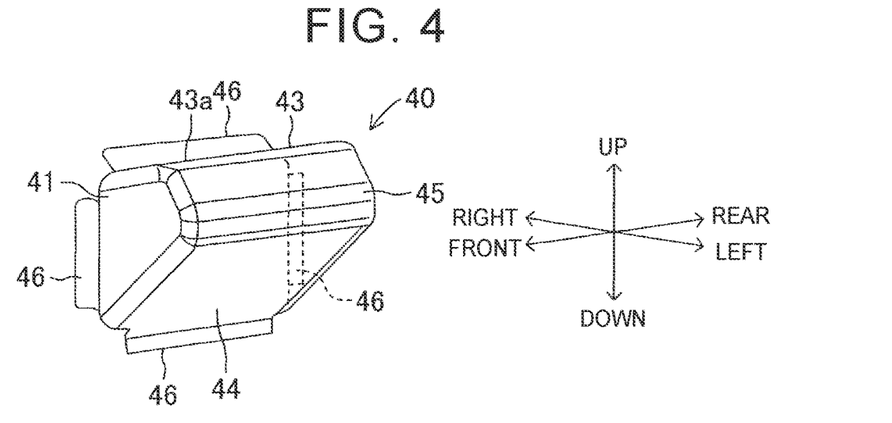
FIG. 4 is a perspective view of a mirror stay viewed from the front side.

As illustrated in FIGS. 2 and 5, the mirror stay 40 is fixed to a front end portion of the reinforcing member 26. A material constituting the mirror stay 40 is a high-strength metal material, for example. In some embodiments, a steel sheet (for example, high tension steel) or an iron plate can be used as the material for the mirror stay 40. In some embodiments, in a case where a material (e.g., an iron plate) having a tensile strength lower than high tension steel is used, the plate thickness of the mirror stay 40 is increased as compared to a case where high tension steel is used. As illustrated in FIGS. 4, 5, etc., the mirror stay 40 includes a front plate portion 41, a rear plate portion 42, a top plate portion 43, a bottom plate portion 44, a side plate portion 45, and fixed portions 46.

The front plate portion 41 and the rear plate portion 42 both have a generally pentagonal front face. Further, the front plate portion 41 and the rear plate portion 42 each have a vertical dimension gradually increasing from the outer end side to the inner end side in the vehicle right-left direction. Front and rear end portions of the flat-shaped top plate portion 43 are connected to an upper edge portion of the front plate portion 41 and an upper edge portion of the rear plate portion 42, respectively. Front and rear end portions of the flat-shaped bottom plate portion 44 are connected to a lower edge portion of the front plate portion 41 and a lower edge portion of the rear plate portion 42, respectively. Front and rear end portions of the side plate portion 45 having a generally V-shaped sectional shape are connected, respectively, to an outer end portion of the front plate portion 41 and an outer end portion of the rear plate portion 42 in the vehicle right-left direction. Further, an upper edge portion of the side plate portion 45 is connected to an outer end portion of the top plate portion 43 in the vehicle right-left direction, and a lower edge portion of the side plate portion 45 is connected to an outer end portion of the bottom plate portion 44 in the vehicle right-left direction. Further, the fixed portions 46 are connected to respective inner end portions, in the vehicle right-left direction, of the front plate portion 41, the rear plate portion 42, the top plate portion 43, and the bottom plate portion 44.

As such, the front plate portion 41 and the rear plate portion 42 each have a vertical dimension gradually increasing from the outer end side to the inner end side in the vehicle right-left direction. Accordingly, the sectional shape (the sectional area) of the mirror stay 40 cut along a plane perpendicular to the vehicle width direction (that is, the right-left direction) gradually increases from the outer end side to the inner end side in the vehicle right-left direction. That is, in the mirror stay 40, the inner end portion in the vehicle right-left direction has the largest sectional shape (sectional area) and the largest mechanical strength. For example, the flexural strength (bending rigidity) at the time when a force in the front-rear direction or a force in the up-down direction is applied to the mirror stay 40 is largest at the inner end portion in the vehicle right-left direction in the mirror stay 40.

As illustrated in FIG. 5, the fixed portions 46 of the mirror stay 40 are fixed by welding to the front end portion of the outer face of the reinforcing member 26 in the vehicle right-left direction. As a welding method, arc welding or spot welding can be used, for example. When the mirror stay 40 is fixed to the reinforcing member 26, the top plate portion 43 and the bottom plate portion 44 slightly incline to a horizontal plane. Further, a part placed outwardly in the vehicle right-left direction from the central part of the mirror stay 40 in the vehicle width direction passes through the opening 23 of the outer panel 22 so as to be placed outwardly from the outer panel 22 in the vehicle right-left direction. Note that a part, of the top plate portion 43, that is placed outwardly from the outer panel 22 in the vehicle right-left direction is referred to as a support portion 43a. Further, when the side door 20 is placed at the fully closed position, the side plate portion 45 is placed outwardly in the vehicle right-left direction from the outwardly projecting portion 22a of the outer panel 22.

Further, as illustrated in FIG. 3, a virtual plane IP perpendicular to the horizontal direction is assumed. When the virtual plane IP approaches the door main body 21 from the outer side in the vehicle right-left direction, the virtual plane IP makes contact with only the side plate portion 45 of the mirror stay 40 and the outwardly projecting portion 22a of the outer panel 22. In other words, when the virtual plane IP makes contact with the side plate portion 45, the virtual plane IP does not make contact with other parts of the outer panel 22 except the outwardly projecting portion 22a.

Figure 6:
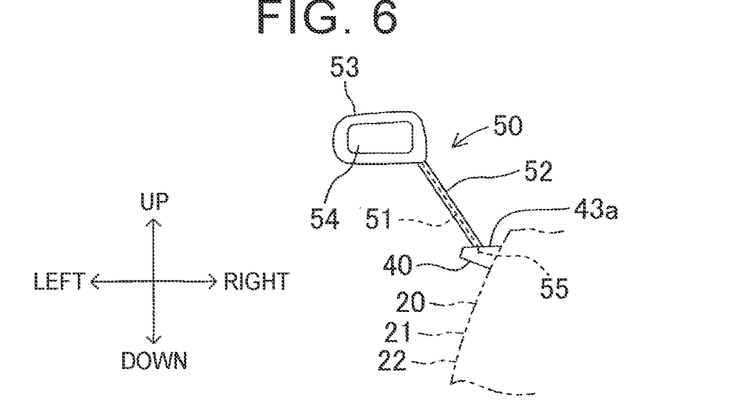
FIG. 6 is a rear view illustrating a part of a side door body, a mirror stay, and a mirror unit.

As illustrated in FIGS. 1, 5, and 6, the mirror unit 50 is attached to the support portion 43a. The mirror unit 50 includes a support 51, a support cover 52, a mirror holder 53, and a mirror 54.

As illustrated in FIGS. 5 and 6, a lower end of the support 51 that is a metal bar-shaped member extending linearly is connected to the support portion 43a via a rotating shaft 55. The support cover 52 that is a cylindrical resin member is fixed to a whole outer peripheral surface of the support 51. Further, a bottom face of the resin mirror holder 53 is fixed to upper ends of the support 51 and the support cover 52. The mirror holder 53 is a hollow body and a whole rear face thereof is opened. The mirror 54 is stored inside the mirror holder 53.

The mirror unit 50 is rotatable relative to the support portion 43a around the rotating shaft 55 between a use position as illustrated in FIGS. 1, 5, and 6 and a folded position (not shown). When the mirror unit 50 is placed at the folded position, the mirror unit 50 comes closer to the front sash 30 and the sliding window 35 as compared to a case where the mirror unit 50 is placed at the use position.

As illustrated in FIGS. 2 and 7, a metal spacer 57 placed behind the mirror stay 40 is fixed to the outer face of the reinforcing member 26 in the vehicle right-left direction. The spacer 57 includes a base portion 58, a front plate portion 61, a rear plate portion 62, and fixed portions 63. The spacer 57 is able to be manufactured by performing press molding on a metal plate, for example. A steel sheet (for example, high tension steel) or an iron plate can be used as the material for the spacer 57, for example. In some embodiments, in a case where a material (e.g., an iron plate) having a tensile strength lower than high tension steel is used, the plate thickness of the spacer 57 is increased as compared to a case where high tension steel is used.

A rib portion 59 extending in the up-down direction is formed in the central part, in the front-rear direction, of the plate-shaped base portion 58 constituting an outer portion of the spacer 57 in the vehicle right-left direction, and a pair of front and rear facing portions 60 is formed such that the front facing portion 60 is placed in front of the rib portion 59 and the rear facing portion 60 is placed behind the rib portion 59. The rib portion 59 is recessed inwardly in the vehicle right-left direction from the facing portions 60. Accordingly, the mechanical strength (e.g., the strength with respect to compression in the right-left direction) of the spacer 57 is higher than that in a case where the rib portion 59 is not formed. An outer end portion of the front plate portion 61 in the vehicle right-left direction is connected to a front end portion of the front facing portion 60, and an outer end portion of the rear plate portion 62 in the vehicle right-left direction is connected to a rear end of the rear facing portion 60. Further, the fixed portions 63 project inwardly in the vehicle right-left direction from respective central parts of the front plate portion 61 and the rear plate portion 62 in the up-down direction (the fixed portion 63 on the rear side is not illustrated herein).

Inner end faces, in the vehicle right-left direction, of upper parts of the front plate portion 61 and the rear plate portion 62 and an upper part of an inner face, in the vehicle right-left direction, of the rib portion 59 make contact with the outer face of the reinforcing member 26 in the vehicle right-left direction, and the front and rear fixed portions 63 are placed right under the reinforcing member 26. Top faces of the front and rear fixed portions 63 are fixed to a bottom face of the reinforcing member 26 by welding. As a welding method, arc welding or spot welding can be used, for example.

As illustrated in FIG. 9, the front and rear facing portions 60 of the spacer 57 face, in the vehicle width direction, an inner face of the outwardly projecting portion 22a of the outer panel 22 in the vehicle right-left direction via a very small gap. Note that the reinforcing member 26, the front sash 30, and the glass run 32 are placed inwardly from the facing portions 60 in the vehicle right-left direction. Accordingly, a dimension, in the vehicle width direction, of a gap formed between the inner face of the outer panel 22 in the vehicle right-left direction and each of the reinforcing member 26, the front sash 30, and the glass run 32 in the vehicle right-left direction is larger than the very small gap formed between each of the front and rear facing portions 60 and the inner face of the outwardly projecting portion 22a in the vehicle right-left direction.

Figure 8A:
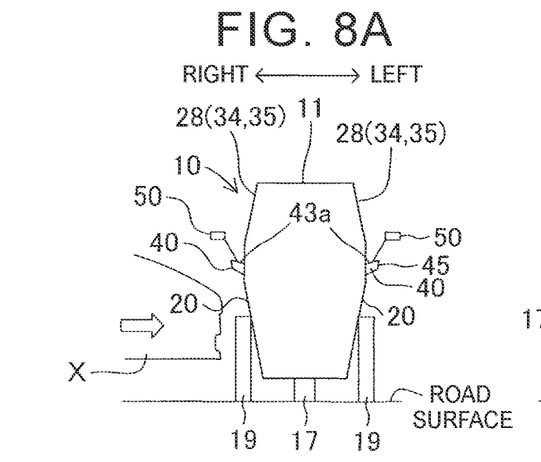
FIG. 8A is a schematic front view illustrating the vehicle of the present embodiment and another vehicle colliding with a right side portion of the vehicle of the present embodiment.

Next will be described a case where another vehicle X collides with the right side portion of the vehicle 10 traveling forward, as illustrated in FIG. 8A, when the right and left side doors 20 are placed at the fully closed positions and the locking mechanisms are in a locked state. In this case, a large lateral force directed from the right side to the left side is generated in the vehicle 10. Accordingly, as illustrated in FIG. 8B, the vehicle 10 might roll over to the left side, and the outer panel 22, the mirror stay 40, and the mirror unit 50 on the left side might collide with a road surface.

Figure 8B:
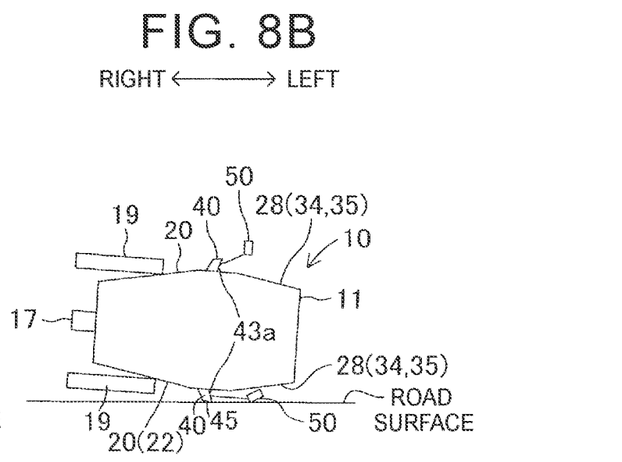
FIG. 8B is a schematic front view illustrating the vehicle of the present embodiment in a state where the vehicle rolls over to the left side.

At this time, as illustrated in FIGS. 8B and 10, the left mirror unit 50 collides with the road surface, so that the left mirror unit 50 deforms (breaks).

Further, as illustrated in FIGS. 8B and 10, the side plate portion 45 (the outer end portion in the vehicle right-left direction) of the left mirror stay 40, the side plate portion 45 being placed outwardly in the vehicle right-left direction from the outwardly projecting portion 22a of the outer panel 22, collides with the road surface. Further, the outwardly projecting portion 22a with which the virtual plane IP makes contact in FIG. 3 collides with the road surface. That is, in a case where the side plate portion 45 of the mirror stay 40 makes contact with the road surface, a risk that other parts of the outer panel 22 (except the outwardly projecting portion 22a) with which the virtual plane IP does not make contact collide with the road surface is small.

In the meantime, the mirror stay 40 is made of metal. Further, the front plate portion 41, the rear plate portion 42, the top plate portion 43, and the bottom plate portion 44 as the constituents of the mirror stay 40 constitute one circular body, and besides, the side plate portion 45 closes an outer end portion of the circular body in the vehicle right-left direction. Accordingly, the mechanical strength (particularly, the strength to bending and the strength to compression described below) of the mirror stay 40 is high. That is, the mechanical strength of the mirror stay 40 is higher than that of the mirror unit 50.

When the mirror stay 40 collides with the road surface, in the mirror stay 40, the largest force in the right-left direction (a compressive load) is applied to the inner end portion in the vehicle right-left direction. However, the sectional shape (sectional area) of the mirror stay 40 is largest in the inner end portion in the vehicle right-left direction in the mirror stay 40, and therefore, a risk that the inner end portion of the mirror stay 40 in the vehicle right-left direction deforms or breaks due to that force is small. Further, when the outer end portion, in the vehicle right-left direction, of the mirror stay 40 in the vehicle 10 traveling forward makes contact with the road surface, a force to bend the mirror stay 40 rearward is applied to the mirror stay 40 from the road surface, and the largest force is applied to the inner end portion of the mirror stay 40 in the vehicle right-left direction. However, since the bending rigidity of the mirror stay 40 is largest at the inner end portion in the vehicle right-left direction in the mirror stay 40, a risk that the inner end portion of the mirror stay 40 in the vehicle right-left direction is largely bent is small. Besides, the mirror stay 40 is fixed to the reinforcing member 26 having a mechanical strength higher than those of the outer panel 22 and the inner panel 25. Accordingly, the whole mirror stay 40 hardly deforms when the mirror stay 40 collides with the road surface.

In the meantime, since the mechanical strength of the outer panel 22 is lower than that of the mirror stay 40, the outwardly projecting portion 22a deforms toward the inner panel 25 side. However, when the outwardly projecting portion 22a deforms toward the inner panel 25 side, the facing portions 60 of the spacer 57 that are fixed to the reinforcing member 26 and have a high mechanical strength (e.g., the strength to compression in the right-left direction) make contact with the inner face of the outwardly projecting portion 22a in the vehicle right-left direction. Accordingly, a risk that the outwardly projecting portion 22a largely deforms toward the inner panel 25 side is small.

As such, when the vehicle 10 rolls over, the mirror stay 40 and the spacer 57 surely receive an impact force generated in the side door 20. Accordingly, although the mirror unit 50 might deform and the outwardly projecting portion 22a might deform inwardly in the vehicle right-left direction, a risk that other parts of the outer panel 22 of the side door 20, except the outwardly projecting portion 22a, collide with the road surface is small. That is, a risk that other parts of the outer panel 22, except the outwardly projecting portion 22a, severely collide with the road surface and greatly deform is small.

Further, in a case where the vehicle 10 rolls over and the mirror stay 40 and the outwardly projecting portion 22a make contact with the road surface, a risk that the door sash 28, the fixed window 34, and the sliding window 35 collide with the road surface is small, as illustrated in FIG. 5B. Accordingly, a risk that the door sash 28, the fixed window 34, and the sliding window 35 break is small.

Note that the disclosure is not limited to the above embodiment and can employ various modifications within the scope of the disclosure.

Figure 11:
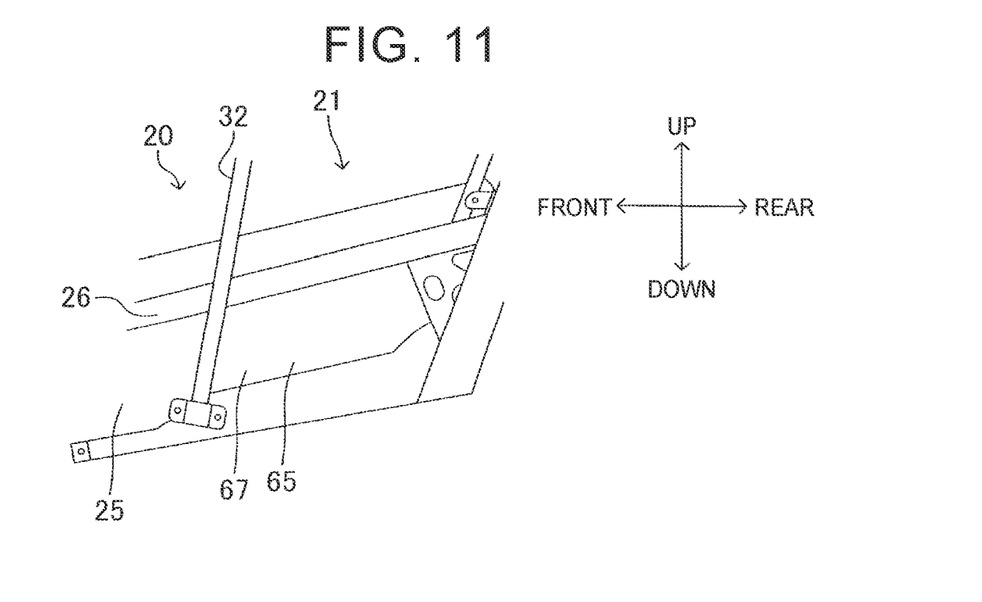
FIG. 11 is a side view of an inner panel, a reinforcing member, a glass run, and a spacer of a modification of the disclosure when they are viewed from the outer side in the vehicle right-left direction.
Figure 12:
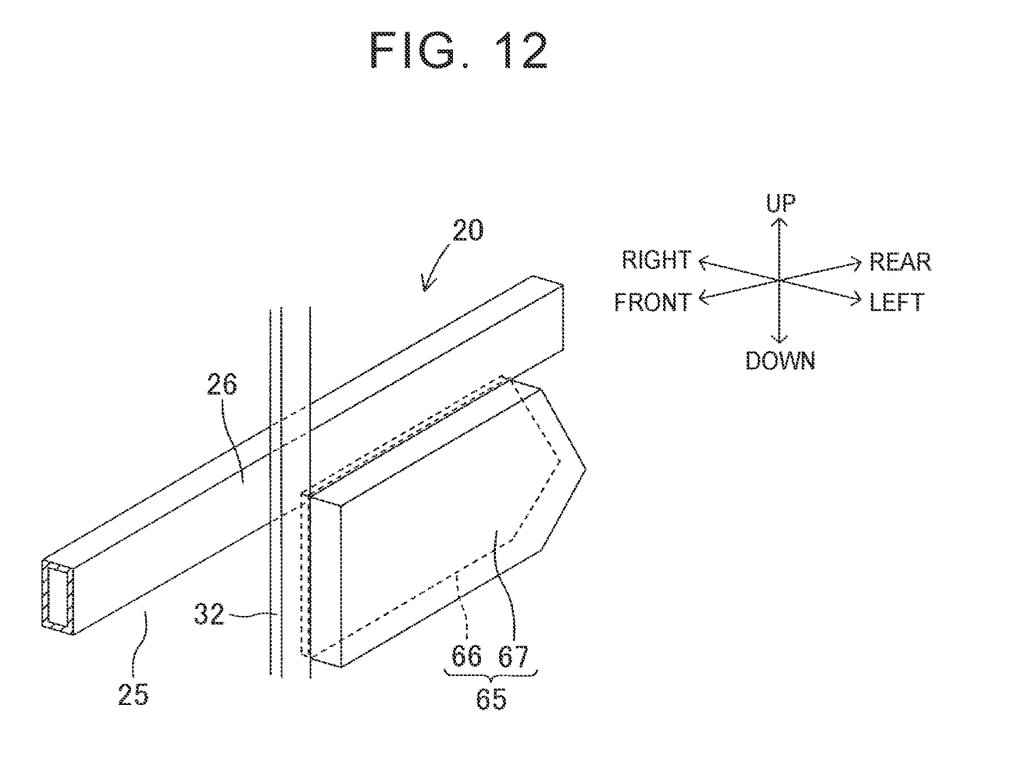
FIG. 12 is a perspective view of the inner panel, the reinforcing member, the glass run, and the spacer of the modification of the disclosure when they are viewed from the outer side in the vehicle right-left direction.

For example, the disclosure may be carried out in an aspect of a modification illustrated in FIGS. 11 and 12. In this modification, a spacer 65 includes a support panel 66 that is a metal plate, and a pad 67 made of hard resin (e.g., urethane) and fixed to an outer face of the support panel 66 in the vehicle right-left direction. The support panel 66 and the pad 67 both have a pentagonal side face. The mechanical strength of the spacer 65 is generally the same as that of the spacer 57. The support panel 66 is fixed to the reinforcing member 26 and the glass run 32 by welding. As a welding method, arc welding or spot welding can be used, for example. Further, although not illustrated herein, the pad 67 faces, in the vehicle width direction, the inner face of the outwardly projecting portion 22a of the outer panel 22 in the vehicle right-left direction via a very small gap. The very small gap has generally the same size as the very small gap formed between each of the facing portions 60 of the spacer 57 and the inner face of the outwardly projecting portion 22a in the vehicle right-left direction.

Accordingly, when the vehicle 10 rolls over and the outwardly projecting portion 22a of the side door 20 collides with the road surface, the outwardly projecting portion 22a deforming toward the inner panel 25 side makes contact with the pad 67, so that a risk that the outwardly projecting portion 22a largely deforms toward the inner panel 25 side is small. On that account, an effect similar to that in the above embodiment can be obtained when the disclosure is carried out in the aspect of this modification.

The spacer 57 (or 65) may be omitted from the vehicle 10.

The mirror unit 50 may be fixed to the support portion 43a in a non-rotatable manner relative to the support portion 43a.

The support 51 and the support cover 52 may be omitted from the mirror unit 50, and the mirror holder 53 may be directly attached to the support portion 43a of the mirror stay 40.

The mirror stay 40 may be fixed to a reinforcing member (not shown) fixed to the inner face of the outer panel 22 in the vehicle right-left direction.

The structure and/or the material of the mirror stay is not limited to the embodiment. For example, at least one of the front plate portion 41, the rear plate portion 42, the top plate portion 43, and the bottom plate portion 44 of the mirror stay 40 may be provided with a rib extending inwardly from the outer side in the vehicle right-left direction along the at least one of them. With such a configuration, the mechanical strength of the mirror stay 40 further increases. Further, the shape of the mirror stay 40 may be a pipe shape or a solid bar shape. Even in a case where the structure and/or the material of the mirror stay 40 is changed, it is necessary that the mechanical strength of the mirror stay 40 be made higher than that of the mirror unit 50, and that the mechanical strength of the mirror stay 40 be as high as possible.

Further, the fixation of the mirror stay 40 to the reinforcing member 26 or a reinforcing member fixed to the outer panel 22 may be a rivet or a bolt.

Further, the structure and/or the material of the spacer is not limited to the embodiment and the modification. For example, the shape of the spacer may be a pipe shape or a solid bar shape. Note that, even in a case where the structure and/or the material of the spacer is changed, it is necessary that the spacer have a mechanical strength to such a degree that the outer panel 22 can be restrained from greatly deforming toward the inner panel 25 side.

The spacer may be fixed to the inner panel 25.

The fixation of the spacer to the reinforcing member 26 or the inner panel 25 may be a rivet or a bolt.

The vehicle 10 may not be a three-wheeled vehicle and may be a four-wheeled vehicle.

The side door 20 may be a sliding door.

What is claimed is:

1. A vehicle side door comprising:
   a door main body configured to open and close a side face opening of a vehicle, the door main body includes an outer panel and an inner panel;
   a mirror stay fixed to the door main body so as to be at least partially placed outwardly from the door main body in a vehicle right-left direction, the mirror stay including a support portion placed outwardly from the door main body in the vehicle right-left direction;
   a mirror unit including a mirror holder supported by the support portion, and a mirror supported by the mirror holder; and
   a spacer disposed in a gap between the inner panel and the outer panel, the spacer being placed behind the mirror stay so as to be fixed to the inner panel or a member fixed to the inner panel, wherein:
   the outer panel constituting an outer face of the door main body in the vehicle right-left direction, the inner panel placed inwardly from the outer panel in the vehicle right-left direction and fixed to the outer panel, and a reinforcing member fixed to the inner panel or the outer panel and extending in a front-rear direction;

the mirror stay is fixed to the reinforcing member;

a section of the outer panel when the outer panel is cut along a horizontal plane has an arcuate shape;

a part, of the arcuate shape, placed on an outermost side in the vehicle right-left direction when the door main body closes the side face opening is an outwardly projecting portion projecting outwardly in the vehicle right-left direction; and the spacer faces the outwardly projecting portion.

2. The vehicle side door according to claim 1, wherein:

an inner end portion of the mirror stay in the vehicle right-left direction is fixed to the reinforcing member; and the mirror stay is configured such that the inner end portion in the vehicle right-left direction has a largest mechanical strength in the mirror stay.

3. The vehicle side door according to claim 2, wherein the mirror stay is configured such that the inner end portion in the vehicle right-left direction has a largest sectional area in the mirror stay when the mirror stay is cut along a plane perpendicular to a width direction of the vehicle.

4. The vehicle side door according to claim 1, wherein the member is the reinforcing member.

\* \* \* \* \*

UNITED STATES PATENT AND TRADEMARK OFFICE
CERTIFICATE OF CORRECTION

PATENT NO. : 10,967,713 B2  
APPLICATION NO. : 16/395568  
DATED : April 6, 2021  
INVENTOR(S) : Takashi Yao, Shigeki Kojima and Tomoyuki Itoh Page 1 of 1

It is certified that error appears in the above-identified patent and that said Letters Patent is hereby corrected as shown below:

In the Specification

In Column 9, Line(s) 41, delete "5B" and insert --8B--, therefor.

Signed and Sealed this  
Fifteenth Day of June, 2021

Drew Hirshfeld  
*Performing the Functions and Duties of the*  
*Under Secretary of Commerce for Intellectual Property and*  
*Director of the United States Patent and Trademark Office*